(12) United States Patent
Phillips et al.

(10) Patent No.: US 7,833,663 B2
(45) Date of Patent: Nov. 16, 2010

(54) METHOD OF MANUFACTURING NICKEL ZINC BATTERIES

(75) Inventors: Jeffrey Phillips, Saratoga, CA (US); Jason Zhao, Suisun, CA (US)

(73) Assignee: Powergenix Systems, Inc., San Diego, CA (US)

( * ) Notice: Subject to any disclaimer, the term of this patent is extended or adjusted under 35 U.S.C. 154(b) by 942 days.

(21) Appl. No.: 10/921,062

(22) Filed: Aug. 17, 2004

(65) Prior Publication Data

US 2005/0064292 A1    Mar. 24, 2005

Related U.S. Application Data

(60) Provisional application No. 60/496,208, filed on Aug. 18, 2003.

(51) Int. Cl.
*H01M 4/42* (2006.01)
*H01M 4/00* (2006.01)

(52) U.S. Cl. .................. 429/229; 429/223; 429/212

(58) Field of Classification Search .......... None
See application file for complete search history.

(56) References Cited

U.S. PATENT DOCUMENTS

| | | | |
|---|---|---|---|
| 3,089,856 A * | 5/1963 | Cyr et al. ............ | 252/519.53 |
| 3,287,164 A | 11/1966 | Arrance | |
| 3,287,166 A | 11/1966 | Arrance | |
| 3,348,976 A * | 10/1967 | Francis et al. ............ | 429/229 |
| 3,432,351 A | 3/1969 | Davee, et al. | |
| 3,558,356 A | 1/1971 | Jost | |
| 3,669,746 A | 6/1972 | Devitt et al. | |
| 3,870,564 A | 3/1975 | Takamura et al. | |
| 3,898,099 A | 8/1975 | Baker et al. | |
| 3,923,544 A * | 12/1975 | Berchielli ............ | 429/219 |
| 3,951,687 A | 4/1976 | Takamura et al. | |
| 4,017,665 A | 4/1977 | Sandera et al. | |

(Continued)

FOREIGN PATENT DOCUMENTS

CN    1434534    6/2003

(Continued)

OTHER PUBLICATIONS

IPDL Machine Translation of JP 61-039452.*

(Continued)

*Primary Examiner*—Dah-Wei D Yuan
*Assistant Examiner*—Maria J Laios
(74) *Attorney, Agent, or Firm*—Weaver Austin Villeneuve & Sampson LLP

(57) ABSTRACT

Methods of manufacturing a rechargeable power cell are described. Methods include providing a slurry or paste of negative electrode materials having low toxicity and including dispersants to prevent the agglomeration of particles that may adversely affect the performance of power cells. The methods utilize semi-permeable sheets to separate the electrodes and minimize formation of dendrites; and further provide electrode specific electrolyte to achieve efficient electrochemistry and to further discourage dendritic growth in the cell. The negative electrode materials may be comprised of zinc and zinc compounds. Zinc and zinc compounds are notably less toxic than the cadmium used in NiCad batteries. The described methods may utilize some production techniques employed in existing NiCad production lines. Thus, the methods described will find particular use in an already well-defined and mature manufacturing base.

15 Claims, 4 Drawing Sheets

U.S. PATENT DOCUMENTS

| | | | |
|---|---|---|---|
| 4,037,033 A | | 7/1977 | Takamura et al. |
| 4,091,181 A | | 5/1978 | Merritt, Jr. |
| 4,118,860 A | * | 10/1978 | Buckler et al. ............ 29/623.5 |
| 4,130,696 A | | 12/1978 | Gunther |
| 4,273,841 A | | 6/1981 | Carlson |
| 4,304,828 A | | 12/1981 | Vaidyanathan |
| 4,327,157 A | | 4/1982 | Himy et al. |
| 4,332,867 A | | 6/1982 | Tsuda et al. |
| 4,364,422 A | | 12/1982 | Brown et al. |
| 4,552,821 A | | 11/1985 | Gibbard et al. |
| 4,554,227 A | | 11/1985 | Takagaki et al. |
| 5,124,120 A | * | 6/1992 | Sklarchuck et al. ........... 419/47 |
| 5,215,836 A | * | 6/1993 | Eisenberg .................. 429/199 |
| 5,455,128 A | | 10/1995 | Tanaka |
| 5,521,021 A | | 5/1996 | Alexandres et al. |
| 5,545,492 A | * | 8/1996 | Zito ............................ 429/29 |
| 5,607,796 A | | 3/1997 | Jacus et al. |
| 5,626,988 A | | 5/1997 | Daniel-Ivad et al. |
| 5,707,756 A | * | 1/1998 | Inoue et al. ................... 429/57 |
| 5,721,072 A | | 2/1998 | Mototani et al. |
| 5,766,789 A | * | 6/1998 | James et al. ................. 429/44 |
| 5,773,176 A | | 6/1998 | Serenyi |
| 5,804,334 A | * | 9/1998 | Yamamura et al. ....... 429/218.1 |
| 5,863,676 A | * | 1/1999 | Charkey et al. ............. 429/229 |
| 6,025,094 A | * | 2/2000 | Visco et al. ............ 429/231.95 |
| 6,287,719 B1 | | 9/2001 | Bailey |
| 6,287,720 B1 | * | 9/2001 | Yamashita et al. .......... 429/131 |
| 6,368,365 B1 | * | 4/2002 | Chi et al. ................... 29/623.1 |
| 6,372,380 B1 | | 4/2002 | Kitami et al. |
| 6,617,072 B2 | | 9/2003 | Venkatesan et al. |
| 6,653,017 B2 | | 11/2003 | Satoh et al. |
| 6,740,446 B2 | | 5/2004 | Corrigan et al. |
| 6,787,265 B2 | | 9/2004 | Phillips |
| 6,790,559 B2 | | 9/2004 | Phillips |
| 6,797,433 B2 | | 9/2004 | Phillips |
| 6,801,017 B2 | | 10/2004 | Phillips |
| 6,818,350 B2 | | 11/2004 | Phillips |
| 6,835,499 B2 | | 12/2004 | Phillips |
| 7,550,230 B2 | | 6/2009 | Phillips et al. |
| 2002/0022175 A1 | * | 2/2002 | Hallifax et al. ................ 429/94 |
| 2002/0164530 A1 | | 11/2002 | Iwakura et al. |
| 2002/0182501 A1 | | 12/2002 | Phillips |
| 2003/0017390 A1 | | 1/2003 | Probst et al. |
| 2003/0113630 A1 | | 6/2003 | Kainthla et al. |
| 2004/0185329 A1 | | 9/2004 | Kainthla et al. |
| 2005/0003270 A1 | | 1/2005 | Phillips |
| 2005/0064292 A1 | | 3/2005 | Phillips |
| 2006/0207084 A1 | | 9/2006 | Phillips et al. |
| 2006/0240317 A1 | | 10/2006 | Phillips et al. |
| 2008/0163478 A1 | | 7/2008 | Phillips et al. |
| 2008/0166632 A1 | | 7/2008 | Phillips et al. |
| 2009/0233159 A1 | | 9/2009 | Phillips et al. |

FOREIGN PATENT DOCUMENTS

| | | |
|---|---|---|
| CN | 1434534 A | 8/2003 |
| CN | 2632866 | 8/2004 |
| CN | 21134449 Y | 10/2008 |
| EP | 0833397 | 4/1976 |
| EP | 0457354 | 11/1991 |
| EP | 0697746 | 2/1996 |
| EP | 0755087 | 1/1997 |
| FR | 2415882 | 8/1979 |
| FR | 2 796 496 | 7/1999 |
| JP | 60-167264 | * 8/1985 |
| JP | 61-039452 | * 2/1986 |
| JP | 06 283194 | 10/1994 |
| JP | 07296813 | 11/1995 |
| WO | WO 93/26056 | 12/1993 |
| WO | WO 00/30192 | 5/2000 |
| WO | WO 00/36686 | 6/2000 |
| WO | 01/18897 | 3/2001 |
| WO | WO /0118897 | 3/2001 |
| WO | WO 02/039517 | 5/2002 |
| WO | WO 0239534 | 5/2002 |
| WO | 02/075825 A2 | 9/2002 |
| WO | WO 02075825 | 9/2002 |
| WO | WO 03088381 | 10/2003 |
| WO | WO 03088384 | 10/2003 |
| WO | 2005/020353 | 3/2005 |

OTHER PUBLICATIONS

PCT International Search Report dated Nov. 23, 2006, from related International Application No. PCT/US2006/007390.

PowerGenix Systems, Inc. "PSI-A Supplier of battery, super capacitor and power systems solutions" from website www.powergenix.com, Aug. 10, 2002.

PowerGenix Systems, Inc. "Next Generation Rechargeable Batteries" Aug. 4, 2003.

PCT International Search Report dated Jan. 26, 2007, from related International Application No. PCT/US2006/007390.

Binder et al., "Corrosion Studies of Zinc Electrode Current Collector," Electrochemical Society Proceedings, Vol. 95-14, pp. 48-65, 1996.

PCT International Search Report dated 10/25/06; App. #PCT/US2006/015807.

PCT Written Opinion dated 10/25/06; App.#PCT/US2006/015807.

Office Action from Chinese Application No. 200480030693.3, dated Nov. 16, 2007.

"Long Life Sealed Nickel-Zinc Cell Using a New Separator", Journal of Power Sources, 9 (1983) pp. 147-159.

English language Abstract of Chinese Patent No. 143454A, downloaded on Dec. 21, 2007 from www.delphion.com.

PCT Search Report, PCT/US2004/026859, Int'l filed Aug. 17, 2004, search completed Feb. 9, 2005.

PCT Written Opinion, PCT/US2004/026859, Int'l filed Aug. 17, 2004, mailed Feb. 18, 2005.

Jindra "Sealed Ni-Zn cells 1996-1998" Journal of Power Sources, vol. 88, No. 2, Jun. 2000.

Jindra "Sealed Ni-Zn cells-1991-1995" Journal of Power Sources, vol. 66, 1997.

Coates et al., "Development of the nickel-zinc battery for commercial applications", Battery conference on Applications and Advances, 2000.

Pavlov et al., "Nickel-zinc batteries with long cycle life", Journal of Power Sources, vol. 62, No. 1, Sep. 1996.

European Office Action dated Feb. 26, 2008, from corresponding European Application No. 06737671.6.

European Office Action dated May 8, 2006, from corresponding European Application No. 04781526.1.

Chinese Office Action dated May 23, 2008, from corresponding Chinese Application No. 200480030693.3.

Chinese Office Action dated Sep. 12, 2008, from corresponding Chinese Application No. 200480030693.3.

Office Action dated Aug. 20, 2008 from corresponding U.S. Appl. No. 11/978,213.

Phillips et al., "Nickel Zinc Battery Design," U.S. Appl. No. 11/116,113, filed Apr. 26, 2005.

Phillips et al., "Electrolyte Composition for Nickel-Zinc Batteries," U.S. Appl. No. 11/346,861, filed Feb. 1, 2006.

Final Office Action dated Apr. 28, 2009 for U.S. Appl. No. 11/978,213.

Office Action dated Aug. 13, 2009 for U.S. Appl. No. 11/978,213.

European Office Action dated Apr. 25, 2008 for European Application No. 06758626.3.

Office Action dated May 1, 2009 for U.S. Appl. No. 11/116,113.

Chinese Abstract for China Publication No. CN21134449Y, published Oct. 15, 2008.

International Search Report and Written Opinion dated Jun. 19, 2009 for Application No. PCT/US2009/038116.

CN Office Action dated Mar. 11, 2010, from CN Appl. No. 200910150533.7.

CN Office Action dated Nov. 7, 2008, from CN Appl. No. 200680013711.6.

CN Second Office Action dated Jun. 5, 2009, from CN Appl. No. 200680013711.6.

CN Third Office Action dated Jan. 8, 2010, from CN Appl. No. 200680013711.6.

CN Office Action dated Feb. 27, 2009, from CN Appl. No. 200680014124.9.

CN Second Office Action dated Feb. 25, 2010, from CN Appl. No. 200680014124.9.

EP Examination Report dated Apr. 21, 2009, from EP Appl. No. 04781526.1.

US Non-Final Office Action dated Oct. 1, 2009, from U.S. Appl. No. 11/367,028.

US Non-Final Office Action dated Dec. 24, 2008, from U.S. Appl. No. 11/978,209.

US Final Office Action dated Feb. 17, 2010, from U.S. Appl. No. 11/978,213.

US Final Office Action dated Nov. 13, 2009, from U.S. Appl. No. 11/116,113.

* cited by examiner

METHOD OF MANUFACTURING NICKEL ZINC BATTERIES

CROSS-REFERENCE TO RELATED APPLICATIONS

This application claims priority under 35 USC §119(e) from U.S. Provisional Application No. 60/496,208, filed Aug. 18, 2003 and titled "METHOD OF MANUFACTURING NICKEL ZINC BATTERIES," which application is incorporated herein by reference for all purposes.

BACKGROUND OF THE INVENTION

1. Field of the Invention

The present invention relates to the rechargeable battery arts and, more particularly to the manufacture of nickel zinc rechargeable battery cells.

2. Description of the Related Art

The advent of portable communication and computation devices that allow diverse mobile connectivity has fueled growth and innovation in the rechargeable battery field. Increased capacity and power has made possible the entry of rechargeable power sources in various fields including the power tool arena. Because power tools typically have large current demands, rechargeable power sources have necessarily evolved to accommodate rapid discharge characteristics. It can be appreciated that the present invention will also find use in applications other than power tools such as Uninterruptible Power Supplies (UPS), Electric Vehicles, and high demand consumer electronics—all of which require high carrying capacity and current discharging ability. Of course, the invention also applies to relatively lower discharge rate applications such as many mainstream consumer electronics applications.

Rechargeable power sources have various benefits over non-rechargeable sources. For example, the use of non-rechargeable power sources raises growing environmental concerns with respect to hazardous waste disposal and remediation. In light of the proliferation of portable devices, the number of non-rechargeable power sources needed to use those devices would be staggering. Rechargeable power sources allow a battery cell to be used repeatedly thus reducing the introduction of hazardous waste products into the environment. Further, rechargeable power sources allow the conservation of the metal and chemical resources that would otherwise be spent in non-rechargeable power sources. Finally, the use of rechargeable power sources encourages and expands continuing conservation efforts that are necessary for a growing population to embrace.

Although the benefits of rechargeable power sources are many, they are not without costs. In particular, the materials that comprise rechargeable power sources frequently pose a significant potential threat to the environment. Regional recycling agencies like the Northeast Recycling Council (NERC) are actively addressing the problems of disposal of rechargeable power sources. In a recent report by NERC, nine of the ten member states banned the disposal of lead acid batteries; six of the ten banned the disposal of Nickel/Cadmium batteries; and four of the ten banned the disposal of mercuric oxide batteries. The EPA has also weighed in and has recently closed feedback on industry wide practices for disposal of NiCad batteries stating, NiCad batteries, commonly used in industrial and household appliances such as cordless phones, power tools and laptop computers, are one of a number of products that pose a potential environmental risk when disposed of incorrectly. The batteries contain both Nickel and Cadmium, the most toxic component, and can cause health problems when not disposed of properly. They are both heavy metals and can also adversely affect the environment during recycling and disposal.

Because of the hazardous nature of some of the commonly used materials for conventional rechargeable power sources, it would be desirable to manufacture a rechargeable power source that reduces the quantity of any potentially hazardous materials. In particular, it would be desirable to find a substitute for the widely used nickel cadmium battery cell.

It has been found that rechargeable nickel zinc cells can provide a power-to-weight ratio comparable to and even exceeding nickel cadmium cells at a reasonable cost. However, nickel zinc battery technology has not been widely deployed for at least two reasons. First, it has been found to have a relatively limited cycle life. In other words, a given nickel zinc cell can only charge and discharge for a fraction of the cycles typically attained with a comparable nickel cadmium cell. This is due to zinc distribution and dendrite formation. Second, there has not been a suitable high volume manufacturing process developed for nickel zinc batteries.

It would be desirable to use, to the extent possible, existing manufacturing techniques to produce environmentally safer rechargeable power sources in order to leverage the existing manufacturing infrastructure rather than require a wholly new manufacturing base.

SUMMARY OF THE INVENTION

The present invention accomplishes the advantages described above by employing a nickel-cadmium type manufacturing process with certain important variations that allow for replacement of the cadmium negative electrode with a less deleterious negative electrode, such as an electrode fabricated from zinc or a zinc compound such as zinc oxide or calcium zincate. Various methods of manufacturing a cadmium-free power cell are described herein. The methods employ high volume lines for nickel and zinc electrode fabrication. As part of the manufacturing process, slurries or pastes of negative and positive electrode materials are continuously coated onto a carrier sheet.

The positive electrode material preferably has a composition similar to that employed to fabricate the nickel electrode in a conventional nickel-cadmium battery, although there may be some important optimizations for the nickel zinc battery system. The negative electrode preferably employs zinc oxide as an electrochemically active material. In some embodiments, the negative electrode includes other materials such as bismuth oxide and/or aluminum oxide. The carrier for the negative electrode (which serves as a current collector) should be electrochemically compatible with the negative electrode materials. For a zinc electrode, for example, the carrier material is preferably copper or an alloy of copper in the form of a perforated sheet or an expanded metal.

In one embodiment, the negative electrode materials include dispersants to minimize agglomeration of zinc oxide particles, as agglomeration has been found to adversely affect the performance of nickel zinc cells. In further embodiments, the methods employ multiple sheets (e.g., four) of separator material that separate the electrodes and minimize formation of zinc dendrites. Examples of suitable separator materials include nylon sheets and microporous polyolefin sheets. Further, the fabrication methods of this invention preferably make use of a high conductivity electrolyte that discourages dendritic growth in the zinc electrode.

Importantly, the fabrication methods produce cells having a zinc negative electrode, yet they utilize certain production techniques heretofore reserved for other cell types. In particular, existing nickel cadmium production lines may be utilized with minor modifications to accommodate the methods described herein. In one example, the method employs the following sequence: coating positive and electrode current collector sheets with pastes or slurries of positive and negative electrode materials, drying and compressing the nascent electrode sheets, cutting and cleaning the sheets, and forming a "jelly roll" cell assembly from the cut electrode sheets and interleaved microporous separator sheets. The methods described will find particular use in an all ready well-defined and mature manufacturing base.

Finally, methods are disclosed to increase the efficiency of the rechargeable power cells by reversing the polarity of the cell such that the terminals are reversed veer conventional methods of manufacture.

BRIEF DESCRIPTION OF THE DRAWINGS

The invention may be understood more fully by reference to the following description taken in conjunction with the accompanying drawings in which.

It is to be understood that, in the drawings, like reference numerals designate like structural elements. Also, it is understood that the depictions in the figures are not necessarily to scale.

DETAILED DESCRIPTION OF THE PREFERRED EMBODIMENTS

The present invention relates generally to techniques for the manufacture of nickel-zinc rechargeable battery cells using techniques similar to generally accepted production techniques for nickel-cadmium rechargeable power cells.

Embodiments of this aspect of the invention are discussed below with reference to FIGS. 1-4b. However, those skilled in the art will readily appreciate that the detailed description given herein with respect to these figures is for explanatory purposes as the invention extends beyond these limited embodiments.

Figure 1:
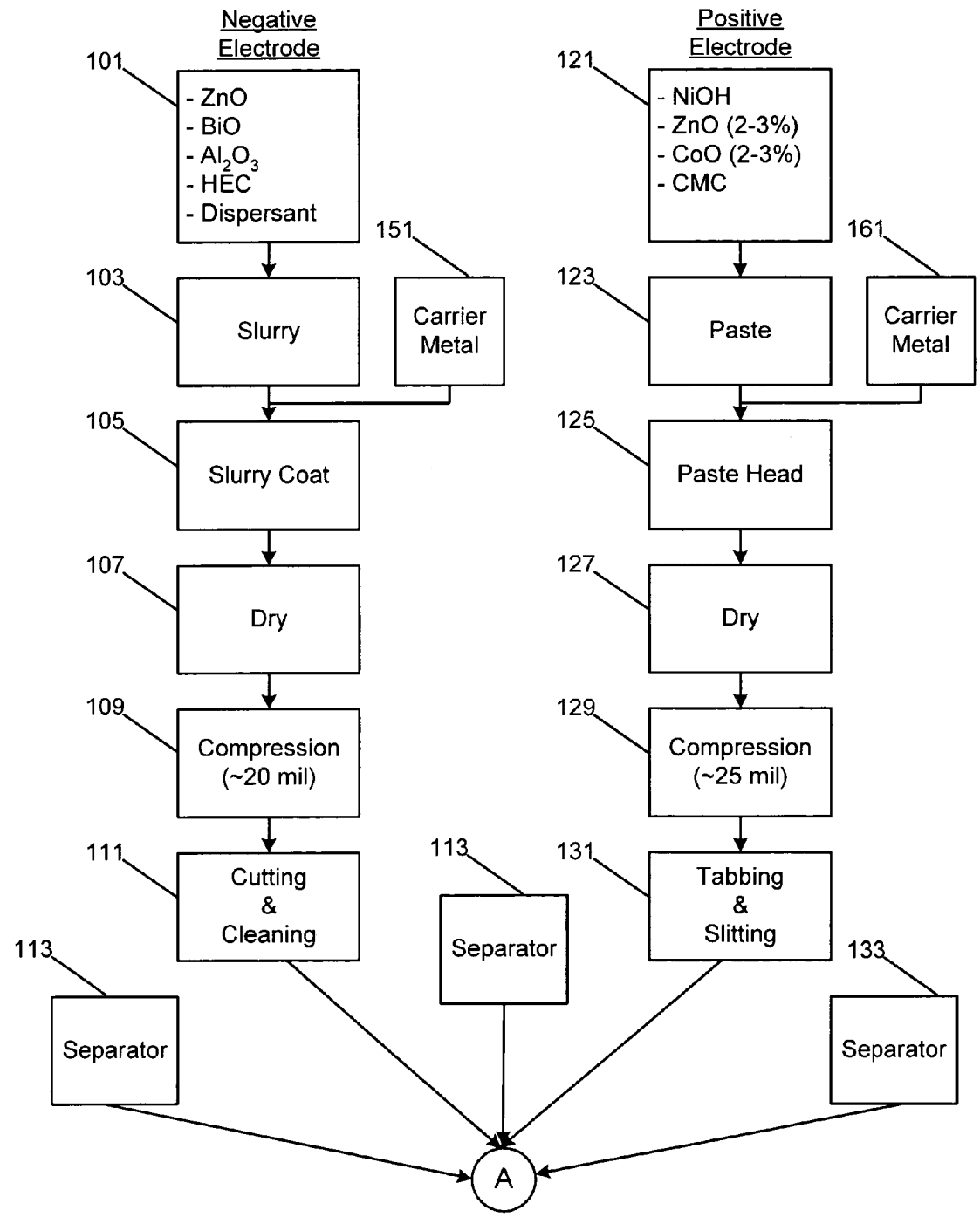
FIG. 1 is a diagrammatic representation of the process flow of an embodiment of the present invention.

Turning first to FIG. 1, FIG. 1 presents a diagrammatic representation of a manufacturing process flow for an embodiment of the present invention. Initially, the process includes two separate paths, one for fabricating a negative electrode sheet and the other for fabricating a positive electrode sheet. Eventually, in the process described, these two paths converge when the separate negative and positive electrodes are assembled into a single cell. Typically, the process steps of these two paths are performed in parallel, within a single plant, so that the electrodes can be continuously formed as sheets that are then continuously combined in the process of forming nickel zinc cells in accordance with this invention.

Blocks 101 and 121 depict example starting materials for the positive and negative electrodes. These blocks represent the fact that the manufacturing process must begin by providing the requisite starting materials for creating electrodes. In addition to the raw electrode formulation materials, the process will also require electrode carrier sheets (comprised of conductive material that ultimately serves as the current collectors in the assembled cells) as well as separator sheets for separating the positive and negative electrodes in the assembled cells, electrolyte, water to form electrode pastes or slurries, and cell packaging materials (e.g., disk terminals, a cell can, etc.).

Considering the negative electrode first, the manufacturing process begins by providing the negative electrode materials (101) required to form the negative electrode. In the example embodiment shown in FIG. 1, negative electrode materials (101) include ZnO, $Bi_2O_3$, $Al_2O_3$, HEC, and dispersant. Indium oxide is also included in some embodiments. Various other formulations are possible, including those that employ other forms of zinc, such as calcium zincate or precursors thereof (e.g., calcium oxide and zinc oxide). Other electrode formulations include various inorganic fluorides, inorganic fibers such as alumina-silica fibers, and organic fibers such as cotton flock etc.

As noted above, the invention is generally directed to methods of manufacturing nickel zinc batteries. As such, the negative electrode materials are based on zinc and zinc compounds, which are significantly less hazardous than the more commonly used cadmium compounds. The EPA has classified zinc and zinc compounds in Group D indicating inadequate evidence as to its carcinogenic potential (U.S. EPA, 1995a). Further, the International Agency for Research on Cancer (IARC) has not classified zinc as to its carcinogenic potential (IARC, 1987a). In contrast, epidemiological evidence strongly supports an association between cadmium exposure and neoplasia, including respiratory and renal cancers (ARB, 1986c). Further, the EPA has classified cadmium in Group B1: Probable human carcinogen, based on human and animal studies showing an increase of lung cancer (U.S. EPA, 1994a). Further, the IARC has classified cadmium and cadmium compounds in Group 1: Human carcinogen based on epidemiological evidence of carcinogenicity in humans and carcinogenic effects observed in animals (IARC, 1993b).

As indicated, zinc oxide is a suitable electrochemically active material for use in the negative electrode. Other zinc compounds having may be utilized as well. In particular, another example embodiment, calcium zincate ($CaZn(OH)_4$), may be used as a starting material in place of ZnO. It can be appreciated that producing calcium zincate can comprise potentially damaging exothermic reaction. The reaction is also strongly dehydrating and can be difficult to control during generation of a slurry or paste for manufacturing the negative electrode. Therefore, if calcium zincate is to be used, it should at least be partially pre-formed ex situ. Only then should it be added to the mixture of negative electrode materials. A general procedure for using calcium zincate in this manner is described in PCT Patent Application No. CA02/00352 (International Publication No. WO 02/075825) by inventor J. Phillips, filed Mar. 15, 2002, which is incorporated herein by reference for all purposes.

It has been found that a high temperature "burn out" procedure can improve the high rate performance of the resulting zinc electrode. In a typical approach, zinc oxide is heated to a temperature of between about 300 and 380° C. (preferably about 320° C.) for a period of between about 0.5 and 2 hours in an inert atmosphere or under vacuum (to limit oxidation of underlying copper current collectors). The burn out procedure may remove dispersion agents and other organic materials believed to have a detrimental effect on high rate discharge of zinc electrodes. Alternatively, or in addition, the burn out procedure may remove carbonate, which may impede high rate discharge. It may reduce the conductivity of the electrolyte by, possibly, depleting hydroxide from the electrolyte and/or reducing the transport capability of the electrolyte. Unfortunately, zinc oxide readily reacts with carbon dioxide in the ambient to form zinc carbonate. Hence the surface of zinc oxide particles exposed to the ambient can gradually attain relatively high amounts of carbonate. Many commercial sources of zinc oxide have significant carbonate content. To mitigate this problem, it may be desirable to heat the zinc oxide and drive off carbon dioxide prior to electrode manufacture. In a preferred embodiment, the zinc oxide used to manufacture negative electrodes contains not greater than about 1 percent by weight of carbonate.

In addition to the zinc oxide or other electrochemically active zinc source, the negative electrode slurry or paste may include other materials that facilitate certain processes within the electrode such as ion transport, electron transport, wetting, porosity, structural integrity, active material solubility etc. Other additives control the consistency for flow and other process-relevant properties of the slurry or paste itself. In a specific embodiment, the negative electrode slurry includes bismuth oxide, aluminum oxide, hydroxyethyl cellulose (HEC), and a dispersant.

Hydroxyethyl cellulose (HEC) may be used to control the consistency of the slurry or paste of negative electrode materials. HEC is a nonionic, water-soluble polymer that can thicken, suspend, bind, emulsify, form films, stabilize, disperse, retain water, and provide protective colloid action. It is readily soluble in hot or cold water and can be used to prepare solutions with a wide range of viscosities. Also, it has outstanding tolerance for dissolved electrolytes. Hence, HEC or other material with related properties is used in the present invention to force the negative electrode materials (in its paste form) to retain water.

In one approach to forming a negative electrode slurry, two separate mixtures are produced and then combined to form the slurry. The first mixture comprises water and HEC (or other suitable material) and the second mixture comprises water and pre-sieved solids (e.g., ZnO, $Al_2O_3$, $Bi_2O_3$, and dispersant).

Other negative electrode compositions are described in the following documents, each of which is incorporated herein by reference: PCT Publication No. WO 02/39517 (J. Phillips), PCT Publication No. WO 02/039520 (J. Phillips), PCT Publication No. WO 02/039521, PCT Publication No. WO 02/039534 (J. Phillips), and U.S. patent application Ser. No. 10/098,195 filed Mar. 15, 2002. Among the negative electrode additives described in these references are silica and fluorides of various alkaline earth metals, transition metals, heavy metals, and noble metals.

As indicated, the manufacturing process preferably employs low carbonate zinc oxide. Unfortunately it has been found that low carbonate zinc oxide agglomerates in suspension much more readily than the typical higher carbonate oxide. Hence it has been found difficult to produce negative electrodes with well mixed, evenly dispersed components, as the zinc oxide tends to form agglomerates. To address this problem, the present invention employs a dispersant to minimize agglomeration of low carbonate zinc oxide particles. Generally, a dispersant modifies the surface properties of particles to facilitate dispersal throughout a slurry or other suspension. Many dispersants are conventional surfactants or variations thereof tailored for the surface properties of particular particles to be dispersed. As zinc oxide is widely used in the paint industry, various dispersants for the oxide have been developed. One such dispersant is commercially available as NOPCOSPERSE 44, an anionic water soluble polymeric dispersant by San Nopco Ltd, of Kyoto Japan. The dispersant, in sufficient quantity, has been found to coat the surface of the zinc oxide particles thus eliminating the agglomeration of zinc oxide particles in manufacturing processes of this invention.

Returning to FIG. 1, the negative electrode materials (101) are combined as described above to form a water-based slurry (103) and continuously applied to a conductive carrier sheet (151) as a slurry coat (105). It can be appreciated by one skilled in the art that the material may also be made into a paste and continuously applied via a paste head as in step 125 for the formation of the positive electrode. In a specific example, the paste head applies negative electrode paste mix at a pressure of approximately 3 psi to one side of the carrier sheet. If slurry coating is employed, a conventional slurry coating apparatus may be used. In such apparatus, a continuous supply of slurry is provided to a chamber through which the carrier sheet passes.

Note that conventional zinc electrodes are formed by vacuum techniques that draw paste or slurry onto the carrier of the negative electrode. In some cases, where calcium zincate has been used as the active material, a petroleum-based additive is employed to promote fibrillation of Teflon that facilitates the production of an electrode sheet that may be pressed onto the carrier.

It can be appreciated that any of a number of carrier materials may be used to form the positive electrode including, but not limited to, nickel, nickel plated steel, silver, and the like. One skilled in the art will understand that the carrier sheet serves as the current collector for the negative electrode in the finished nickel zinc cell. Copper and copper alloys are particularly preferred materials for the carrier sheet given copper's low resistivity, relatively low price, and electrochemical compatibility with the zinc electrode. Notably, nickel plated steel is the carrier of choice for the cadmium electrode in commercial nickel cadmium cells.

The carrier sheet can be provided in various structural forms including a perforated metal sheet, an expanded metal, and a metal foam. Among the criteria employed to select a particular structural form are cost, ease of coating, and ability to facilitate electron transport between the electrochemically active electrode material and the current collector. In a preferred embodiment, the thickness of the carrier is between about 2 and 5 mils for perforated sheet but may be between 2 and 20 mils for expanded metal. Metal foam substrates may be between 15 and 60 mils.

Once the negative electrode is coated, it is dried (107) to drive off excess water used as a delivery medium for the electrode material. A thermal drier employing flowing air or nitrogen may be employed for this purpose.

The resulting negative electrode is then compressed (109) using a roller or other appropriate compression mechanism. As can be appreciated by one skilled in the art, compression brings the electrode to a uniform thickness so that manufacturing tolerances may be maintained. Compression also brings the negative electrode to a desired porosity. It can be appreciated that porosity controls the transport properties of ions between electrolyte and electrode. Porosity also dictates the active surface area and hence the current density of the negative electrode. In a typical example, the post-compression thickness of the negative electrode is between about 10 and 40 mils (e.g., about 20 mils) and the porosity is between about 40 and 65%.

After compressing the electrode sheet by an appropriate degree, it may be cut and cleaned at a step 111. Note that the carrier sheet typically has a width significantly greater than that required for a single battery cell; e.g., the width may be on the order of one yard. Therefore, the negative electrode is cut to a width conforming to end-product specific tolerances (e.g., approximately 1.25 inches for a sub C size cell for example). A portion of the cut negative electrode may be "cleaned" prior to further assembly. In particular, a strip of the negative electrode material along the edgewise length of the negative electrode is removed. The cleaned strip facilitates the attachment of a terminal to the negative electrode current collector at a further step 203 by exposing the underlying current collector metal. While other methods of terminal attachment may be accomplished, cleaning leaves a surface that is particularly well suited to soldering, spot welding, or any other type of electro-conductive bonding known in the art. As can be appreciated by one skilled in the art, cleaning the electrode may be accomplished by any of the following methods without limitation: scraping, scouring, grinding, washing, and wiping. This is typically achieved in combination with a vacuum clean up to eliminate particulate matter.

In like manner, as discussed above for the negative electrode, the positive electrode may be formed. Beginning at an initial step 121, positive electrode materials are provided to form the positive electrode. In an example embodiment and as shown in FIG. 1, the positive electrode materials (121) comprising nickel hydroxide ($Ni(OH)_2$), zinc oxide, cobalt oxide (CoO), nickel metal, optionally cobalt metal, and a flow control agent such as carboxymethyl cellulose (CMC) are provided. In a preferred embodiment, at least some of the zinc oxide and cobalt oxide are provided with the nickel hydroxide in a chemical mixture, whereby individual particles contain nickel hydroxide, zinc oxide and cobalt oxide. Such premixed materials may be prepared by co-precipitation of the individual components and may be acquired in a commercially available formula from commonly known vendors such as International Nickel Corporation, and Tanaka. These materials prevent leaching by locking the oxides into the insoluble nickel matrix. Co-precipitation also apparently helps charge transfer efficiency by creating conductive channels through the positive electrode materials. In a preferred embodiment, the zinc oxide and cobalt oxide are each present in the co-precipitated material in concentrations of about 2-3% by weight for the zinc and about 2-6% for the cobalt oxide. Further, the positive electrode materials may additionally include chemically pure cobalt and nickel metal.

If cobalt metal is employed in the positive electrode, it is preferably present in a concentration of between about 1% to 10% by weight. This concentration range is appropriate for a wide range of discharge rates (e.g., about 0.001 to 0.4 Amperes/$cm^2$ of zinc electrode surface area). In a typical high rate application (e.g., discharge is conducted at about 0.01 to 0.4 Amperes/$cm^2$ of zinc electrode surface area), the concentration of cobalt metal is between about 4-10% by weight in the positive electrode. In a typical low rate application, the concentration of cobalt metal is between about 1-5% by weight, and the discharge is conducted at about 0.001 to 0.01 Amperes/$cm^2$ of zinc electrode surface area.

In alternate embodiments, cobalt oxide may be added to the material to enhance conductivity at operation 121. However, it is generally preferred that the starting materials include little or no additional cobalt oxide. Note that in commercial nickel cadmium cells, free cobalt oxide is commonly employed in the positive electrode mixture.

In one approach, the positive electrode paste is formed from two separate mixtures: one that includes CMC (carboxymethylcellulose) and water and another that includes water and the co-precipitated nickel hydroxide—cobalt oxide—zinc oxide, nickel metal, and relatively pure cobalt oxide. These to mixtures are then combined to form the positive electrode paste. Note that the CMC is included to improve flow characteristics for the resulting paste at step 123.

A few positive electrode compositions are described in the following documents, each of which is incorporated herein by reference: PCT Publication No. WO 02/039534 (J. Phillips) (co-precipitated $Ni(OH)_2$, CoO and finely divided cobalt metal) and U.S. patent application Ser. No. 10/098,194 filed Mar. 15, 2002 (fluoride additives).

At block 125, the paste is continuously applied to a positive electrode carrier sheet via a paste head. It can be appreciated that any of a number of carrier metals may be used to form the negative electrode so long as they meet appropriate design criteria such as low cost, high conductivity, electrochemical compatibility with the positive electrode, and good contact with the electrochemically active material. Examples include, but not limited to, nickel and nickel-plated stainless steel. The carrier metal may possess one of various structural forms including perforated metal, expanded metal, sintered metal, metal foam and metal-coated polymer materials. In a preferred embodiment, the carrier is a nickel metal foam formed by, for example, pyrolyzing a urethane foam on which nickel was electrolytically deposited. The thickness of the foam positive electrode carrier after undergoing a prepress to ensure thickness uniformity is between about 15 and 60 mils, for example.

Once the carrier sheet is coated with positive electrode material, the resulting sheet is dried (127) to drive off excess water and then compressed (129). These process operations can be performed in much the same manner as operations 107 and 109 for the negative electrode. As can be appreciated by one skilled in the art and as noted above for the negative electrode, compression brings the electrode to a uniform desired thickness and porosity as described above for the negative electrode path. Preferably, the resulting positive electrode sheet has a thickness of between about 15 and 40 mils (e.g., about 25 mils) and has a porosity of between about 30 and 45%.

The positive electrode is then tabbed and slit at a step 131. The slitting of the electrodes to width may be done before or after tabbing, however most automated lines slit the electrode stock after an in-line tabbing process. Tabbing of the coined edges facilitates the final welding of the current collector arrangement after winding of the jelly-roll. The tab consists of a strip of nickel or nickel-plated steel that is seam welded, resistance welded or ultrasonically welded to a coined unpasted edge of the electrode. This creates a solid strip along the length of the electrode that promotes a strong bond to the current collection disc.

At this point in the process, the two paths (negative electrode fabrication and positive electrode fabrication) converge to provide a layered arrangement of sheets that remain with the cell to completion. At the convergence point (represented as "A" in FIG. 1), multiple sheets of material are brought together and wound or otherwise assembled into a cell structure. In a particular example four sheets of separator material (depicted as sources 113 and 133) are interleaved with the positive electrode sheet and the negative electrode sheet. Thus, once the electrodes are fabricated, they are sandwiched between semi-permeable separator sheets (113, 133).

In an example embodiment, the separator for the positive electrode (113) comprises a plurality of sheets of a microporous polyolefin that may be commonly acquired as CELGARD™ line of separators from Celgard Inc. (Charlotville, N.C.) or SOLUPORE products from Solutech. The separator serves to mechanically isolate the positive and negative electrodes, while allowing ionic exchange to occur between the electrodes and the electrolyte. Thus, good permeability to the electrolyte is desirable. In an example embodiment, the separator for the negative electrode (133) comprises a nylon sheet. Other separator materials known in the art may be employed. As indicated, nylon-based materials and microporous polyolefins (e.g., polyethylenes and polypropylenes) are suitable.

Figure 3:
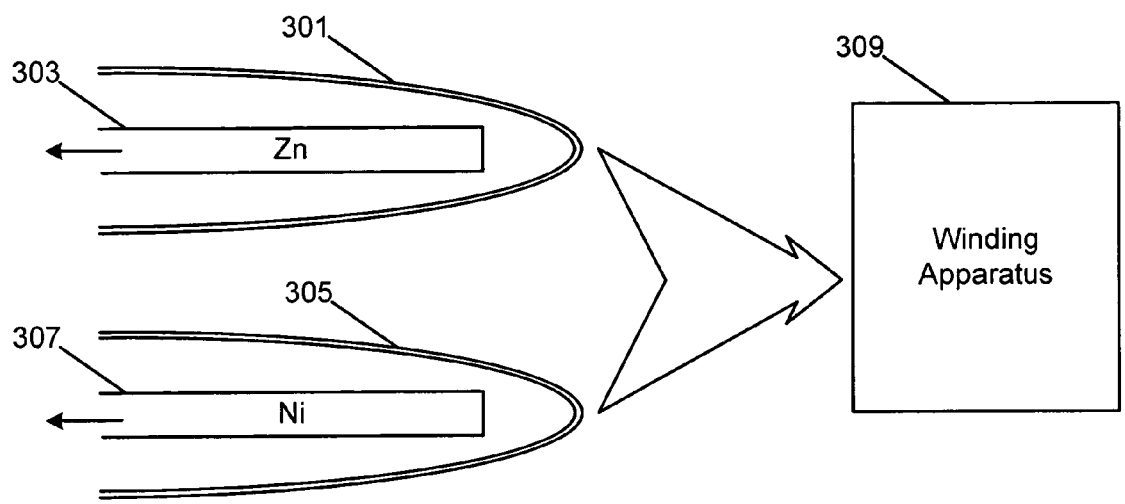
FIG. 3 is a graphical cross-sectional representation of the cathode and anode prior to winding.

Turning briefly to FIG. 3, FIG. 3 is a cross-sectional representation of the positive and negative electrodes prior to winding. In the illustrated example, separators (301, 305) are initially folded over the electrodes (303, 307) along the electrode's planar surface before being drawn or fed, with the electrode sheets, into a winding apparatus 309. In this approach two sources of separator are employed. In an alternative embodiment, each electrode sheet is straddled by two separate sources of separator sheet so that four sources of separator, rather than two are employed. Thus, initially, a separator sheet is not folded over the leading edge of an electrode. However, the resulting layered structure is the same. Both approaches produce a structure in which two layers of separator separate each electrode layer from the next adjacent electrode layer. This is generally not the case with nickel cadmium cells, which employ only a single layer of separator between adjacent electrode layers. The additional layers employed in the nickel zinc cell help to prevent shorting that could result from zinc dendrite formation.

Dendrites are crystalline structures having a skeletal or tree-like growth pattern ("dendritic growth") in metal deposition. In practice, dendrites form in the conductive media of a power cell during the lifetime of the cell and effectively bridge the negative and positive electrodes causing shorts and subsequent loss of battery function.

Note that the separator sheets generally do not entirely cover the full widths of the electrode sheets. Specifically, one edge of each electrode sheet remains exposed for attaching terminals at step 203. This is the edge that was wiped clean of electrode material at steps 111 and 131. Further, and for the same reason, the electrodes are offset laterally by approximately the width of the cleaned strip that was discussed above. This presents one lateral edge having only exposed negative current collector and the opposite lateral edge having only exposed positive current collector to accommodate terminal attachment in step 203.

The winding apparatus draws the various sheets in at the same time and rolls them into a jellyroll-like structure. After a cylinder of sufficient thickness is produced, the apparatus cuts the layers of separator and electrodes to produce the finished cell assembly.

Figure 2:
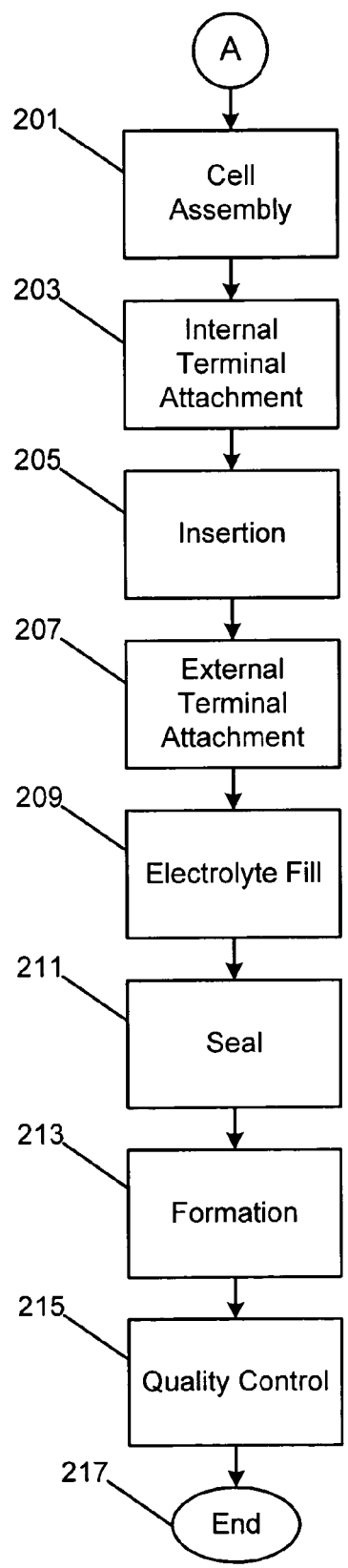
FIG. 2 is a further diagrammatic representation of the process flow of an embodiment of the present invention.

Turning to FIG. 2, a continuation of the process flow of FIG. 1 is shown. The process of FIG. 2 begins with a cell assembly 201 resulting from the assembling operation "A." For cylindrical cells, this assembly is a jellyroll-like structure. In an alternative embodiment, it is a rectangular or prismatic layered structure. It can be appreciated by one skilled in the art that the form factor of the cell assembly is user dependent and may take any of a number of forms well known in the art. If a prismatic form is used, it may be desirable to pre-wrap the positive and negative electrode sheets in their own separators prior to assembly.

Once winding or other assembly of electrode layers and interleaved separator layers is complete, separate internal terminals are conductively attached (203) to each of the negative electrode and the positive electrode. More specifically, a positive terminal is conductively attached to the exposed positive current collector at one axial end of the cell assembly and a negative terminal is conductively attached to the exposed negative current collector at the other axial end of the cell assembly. Attachment of the internal terminal may be accomplished by any method well known in the art such as spot welding, ultrasonic welding, laser welding, soldering, or any other type of electro-conductive bonding appropriate for the terminal and current collector materials. In one embodiment of the present invention, the internal terminals comprise disks, which may or may not be perforated or slotted. In another embodiment, the internal terminals comprise H-shaped structures. Regardless of their actual structure, the internal terminals may be conductively attached to the electrodes without requiring tabs to be present on the electrode with which an internal terminal may attach.

After the internal terminals are attached, the cell assembly is inserted into a retaining vessel (205) such as a can in the case of a cylindrical cell assembly. The can or other vessel serves as the outer housing or casing of the final cell. With the cell assembly in the can, the terminal disks (or other internal terminals) can be conductively attached to the cell's can and lid or other external terminals at step 207.

The external terminals provide direct electrical access to the power cell for a powered device. As such, the external terminals, in some embodiments, are preferably plated with a non-corrosive metal such as nickel plate. Further, the external terminals may function to isolate the electrodes from mechanical shock. Given the portable nature of electronic devices, the likelihood of mechanical shock is reasonably high. If the external terminals were directly attached with the electrode current collectors, significant failure of the welded joint or direct damage to the electrodes might occur.

In a next step 209, an appropriate electrolyte is provided. Of particular relevance to the present invention, the electrolyte should possess a composition that limits dendrite formation and other forms of material redistribution in the zinc electrode. Such electrolytes have generally eluded the art. But one that appears to meet the criterion is described in U.S. Pat. No. 5,215,836 issued to M. Eisenberg on Jun. 1, 1993, which is hereby incorporated by reference. A particularly preferred electrolyte includes (1) an alkali or earth alkali hydroxide present in an amount to produce a stoichiometric, excess of hydroxide to acid in the range of 2.5 to 11.0 equivalents per liter, (2) a soluble alkali or earth alkali fluoride in an amount corresponding to a concentration range of 0.01 to 1.0 equivalents per liter of total solution, and (3) a borate, arsenate, and/or phosphate salt (preferably potassium borate, potassium metaborate, sodium borate, and/or sodium metaborate). In one specific embodiment, the electrolyte comprises 4.5 to 10 equiv/liter of potassium hydroxide, from 2.0 to 6.0 equiv/liter boric acid or sodium metaborate and from 0.01 to 1.00 equivalents of potassium fluoride. A currently preferred electrolyte for high rate applications comprises 8 equiv/liter of hydroxide, 4.5 equivalents of boric acid and 0.2 equivalents of potassium fluoride.

The invention is not limited to the electrolyte compositions presented in the Eisenberg patent. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation. In the present invention, the use of borate and/or fluoride containing KOH electrolyte along with appropriate separator layers reduces the formation of dendrites thus achieving a more robust and long-lived power cell.

In a specific embodiment, the electrolyte composition includes an excess of between about 3 and 5 equiv/liter hydroxide (e.g., KOH), NaOH, LiOH. This assumes that the negative electrode is a zinc oxide based electrode. For calcium zincate negative electrodes, alternate electrolyte formulations may be appropriate. In one example, an appropriate electrolyte for calcium zincate has the following composition: about 15 to 25% by weight KOH, about 0.5 to 5.0% by weight LiOH.

Various techniques may be employed to fill the vessel with electrolyte. In one example, the electrolyte is introduced via an injection process in which electrolyte enters the cell via a fill port. In other cases the electrolyte may be added prior to lid application and the cell is spun to distribute the fluid.

After the can or other containment vessel is filled with electrolyte, the vessel is sealed to isolate the electrodes and electrolyte from the environment. See block 211. As can be appreciated by one skilled in the art, any of a number of sealing methods may be utilized including, but not limited to crimping, welding, stamping, or gluing. Note that in a cylindrical cell, the lid is typically seated on a gasket residing on a circumferential bead in the upper portion of the can. To effect sealing, the top edge of the can is then crimped down toward the lid without making electrical contact.

Although the cell is generally sealed from the environment, the cell may be, in some embodiments, permitted to vent gases from the battery that are generated during charge and discharge. A typical nickel cadmium cell vents gas at approximately 200 PSI. In some embodiments, a nickel zinc cell is designed to operate at this pressure and even higher (e.g., up to 300 PSI) without the need to vent. This may encourage recombination of any oxygen and hydrogen generated within the cell. Preferably the cell is constructed to maintain an internal pressure of not greater than about 600 PSI and more preferably not greater than about 450 PSI. In other embodiments, a nickel zinc cell is designed to vent gas at relatively lower pressures. This may be appropriate to release hydrogen and/or oxygen gases rather than encourage their recombination within the nickel zinc cell. A vent mechanism is preferably designed to allow gas escape but not allow electrolyte passage that may interfere with the reproducible function of the vent. The use of hydrophobic membranes can be effective for this purpose (see e.g., U.S. patent application Ser. No. 10/098,193, "Leak Proof Pressure Relief Valve for Secondary Batteries," filed Mar. 15, 2002 for J. Phillips, which is incorporated herein by reference for all purposes) and these may be used alone or in conjunction with a tortuous gas escape route. Many other battery venting mechanisms are known in the art and are suitable for use with this invention.

To prepare a cell for use typically requires one or more "formation" cycles to modify the electrode structure. In FIG. 2, formation of the cell is accomplished at step 213. A formation cycle follows a specific voltage-current-time curve that accounts for factors such as electrode composition and cell capacity. In a typical case, formation is accomplished using a large power supply that charges numerous cells at once over a period of, for example, about 24 to 74 hours.

In a specific example, formation and related operations may be performed as follows. The cells are vacuum filled with electrolyte and soaked for less than 2 hours (for comparison, nickel cadmium cells are generally soaked for 24 hours but are usually drip filled). Before the 2 hour period is up the cells are placed on formation charge where a net 100%-150% of the theoretical capacity is input over 24-60 hours. The formation protocol includes a discharge and recharge step that is believed to help distribute electrolyte, but this example can be practiced without this operation. In another example, the mid-formation discharge is eliminated. Cells may be charged singly or with two in series, but in a production environment it is more usual to charge the cells in larger series strings. During formation, one may monitor the voltage behavior over the complete formation process and collect weight loss, impedance values and open circuit voltages to classify and identify possible weak cells.

Once formation is complete, every cell is discharged during a quality control step 215 to determine the particular capacity of each cell. Cells having similar capacities are grouped for use in the same battery packs. In this way, each cell in a battery pack becomes fully charged after receiving substantially the same quantity of charge. Thus, when charge is complete no cell in the pack is significantly under utilized and no cell in the pack is significantly overcharged. Groupings of batteries may be restricted to two or more groupings depending on the nature and sensitivity of the application.

Note that the operations of FIG. 2 are generally the same as or very similar to corresponding operations employed in the manufacture of nickel cadmium cells. Hence, the apparatus employed for these operations in nickel cadmium cell fabrication generally can also be used in nickel zinc cell fabrication. Note, however, that the electrode, current collector, and electrolyte differences may require customized apparatus or processing. For example, the zinc electrode may employ a copper current collector, which cannot be employed with a cadmium electrode. While copper has better electronic conductivity than steel, it can present fabrication issues. For example, attaching a current collecting copper disk to the copper sheet may require specific laser welding settings and the appropriate jigs to provide continuous pressure during the weld.

Nickel zinc cells prepared in accordance with this invention may have particularly useful properties for power tool and UPS applications. For example, energy densities will exceed about 60 Wh/kg and continuous power densities are commonly in excess of about 500 W/kg.

In another embodiment of the present invention, the polarity of the cell's terminals is reversed in comparison to conventional cells for consumer electronics. Many of the same methods of manufacture described herein are utilized to accomplish this embodiment with minor variations that are herein described. In conventional power cell manufacturing, the polarity of the cell is established wherein the lid is positive and the can or vessel is negative. That is, the positive electrode of the cell assembly is electrically connected with the lid and the negative electrode of the cell assembly is electrically connected with the can that retains the cell assembly. Notably, the lid is electrically isolated from the can through the use of a flexible gasket and a bituminous sealing agent.

Figure 4B:
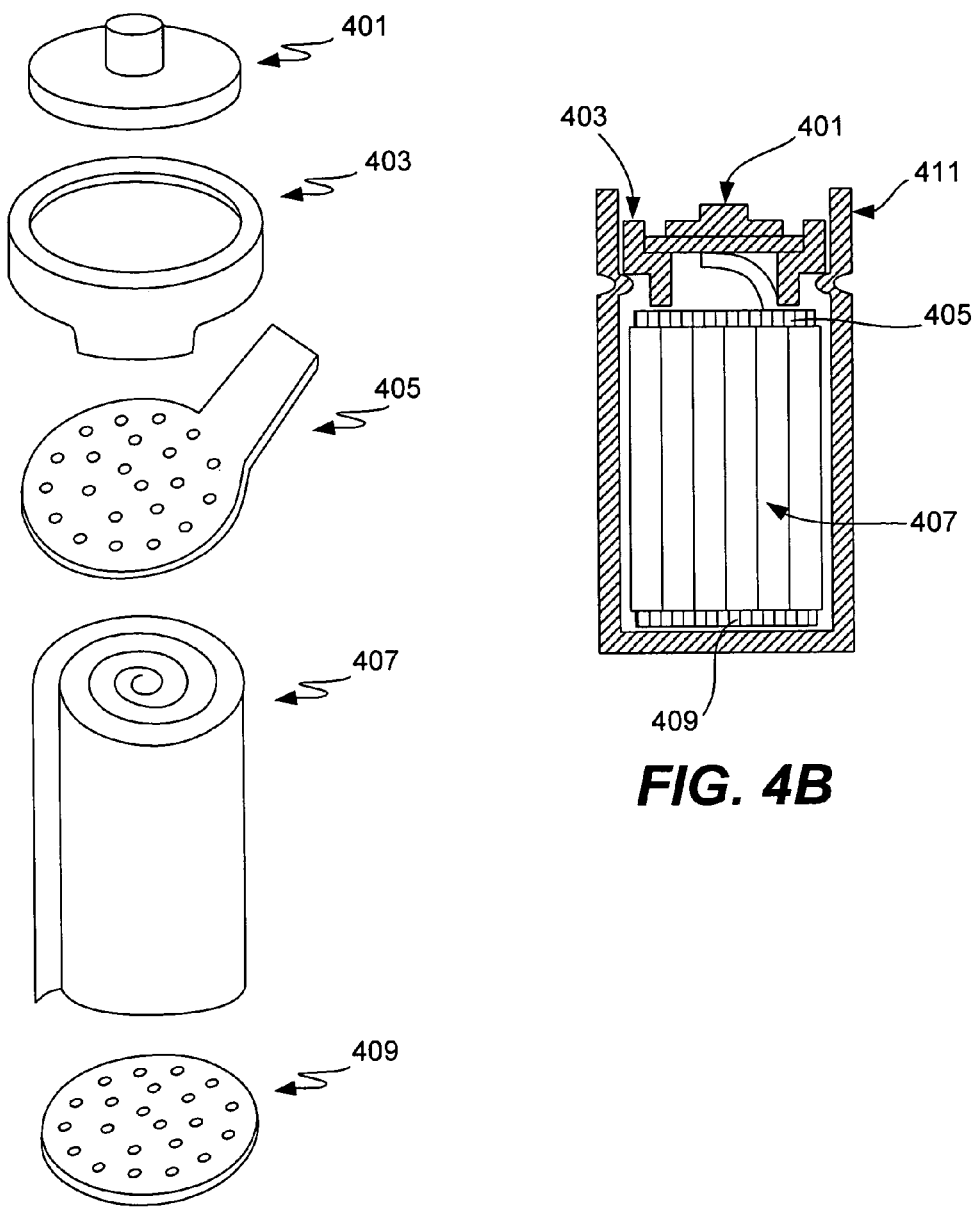
FIG. 4b is a graphical cross-sectional representation of a reverse polarity power cell sub assembly embodiment.
Figure 4A:
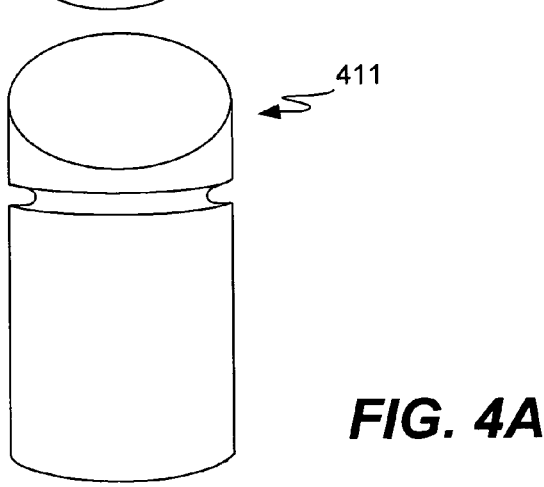
FIG. 4a is a graphical representation of a reverse polarity power cell sub assembly embodiment.

Turning to FIG. 4a, FIG. 4a is a graphical representation of a reverse polarity power cell sub assembly embodiment. A cell assembly (407) is manufactured using the techniques provided herein. A negative internal terminal (405) is electrically connected with the negative electrode of the cell assembly. Because of the unique properties of Nickel/Zinc electrochemistry, the negative internal terminal (405) is preferably comprised of copper. Typically, conventional power cells exhibit an overall impedance of approximately 3 to 5 milliohms. Approximately 0.8 milli-Ohm may be attributed to the positive current collector and the resistance weld to the cap. This is due in part to the compositional requirements of the terminal given the electrochemistry of conventional power cells. In the present embodiment, the use of copper in the manner described results in a significant impedance reduction of approximately 0.5 milli-Ohm at the now negative terminal thus achieving a more power efficient cell. One skilled in the art will appreciate that the foregoing advantages may be achieved by coating or plating the interior surface of the retaining vessel (411) with copper, although this method would necessitate alternative manufacturing steps.

Importantly, copper, in this and other embodiments, requires particular attention when used as an internal terminal. In particular, copper, as is well known in the art, is particularly effective, not only in carrying current, but also in conducting heat. As such, the electrical attachment of the internal terminal with the negative electrode requires specific manufacturing techniques. In an example embodiment, the copper internal terminal is perforated and attached at multiple points along the negative electrode so that the electrode is attached to the current collector at multiple points along its length. By activating a greater area, the charge efficiency is further enhanced. The perforations also serve to locate the electrode and allow electrolyte to penetrate the stack uniformly during the electrolyte fill operation. In another embodiment, the internal terminal is slotted to achieve the named advantages. Further, as noted above, copper is particularly efficient in conducting heat requiring novel techniques of attaching the internal terminal with the negative electrode to avoid damaging the negative electrode. Notably, these novel techniques may be used in conjunction with other techniques well known in the art such as spot welding, ultrasonic welding, laser welding, soldering, or any other type of electro-conductive bonding appropriate for the terminal and current collector materials.

In one preferred embodiment, laser welding is employed to form a low impedance connection between the internal terminal and the copper current collector. In a specific approach, the laser welding is performed in cross fashion or other tracking method that maximizes the number of weldments, in which the laser is moved across the surface of the internal terminal to catch each point. It has been found that good welds can be achieved using laser pulses with a 600 micron beam diameter having a power of between about 0.2 and 5 kW, pulse widths of between about 0.5 and 4 milliseconds and pulse frequencies of between about 1 and 20 Hz. These power levels and duty cycles can be achieved with a pulsed Nd:YAG laser such as model number LW70A from Unitek Miyachi Corporation. In one approach, wound nickel—zinc jelly rolls are inserted into a jig where the copper current collection disc is pressed onto the exposed copper edges of the negative electrode. The laser beam is then programmed to lap weld the connections as it traverses the end of the jelly-roll. The required power levels are dependent on the thickness of the copper electrode substrate and the thickness of the current collection disc. The former is normally between 0.002-0.005 inches and the latter is between 0.002-0.01 inches depending on the cell size and current carrying capability.

Returning to FIG. 4a, the positive internal terminal (409) is electrically connected with the positive electrode using techniques well known in the art. The power cell fabrication then proceeds using the manufacturing techniques described herein. For illustrative purposes, FIG. 4b is presented to further clarify the embodiment described above. In particular, FIG. 4b is a graphical cross-sectional representation of a reverse polarity power cell sub assembly embodiment. Notably, FIG. 4b illustrates the position of the insulating gasket (403) that serves to electrically isolate the negative external terminal (i.e. the lid (401)) from the positive external terminal (i.e. the can (409)). It is contemplated that a variety of materials may be used to achieve electrical isolation in the present embodiment.

The foregoing describes the instant invention and its presently preferred embodiments. Numerous modifications and variations in the practice of this invention are expected to occur to those skilled in the art. Such modifications and variations are encompassed within the following claims.

The entire disclosures of all references cited herein are incorporated by reference for all purposes.

What is claimed is:

1. A method of manufacturing a rechargeable power cell, said method comprising the steps of:
    applying a zinc negative electrode material to a first carrier sheet having first and second opposing and substantially planar surfaces such that a first electrode is formed, wherein the zinc negative electrode material is a slurry including zinc oxide and an organic dispersant to reduce agglomeration of the zinc oxide;
    burning out the organic dispersant in the negative electrode material by heating the negative electrode material at an elevated temperature thereby improving the high rate performance of the negative electrode material;
    applying a nickel positive electrode material to a second carrier sheet having first and second opposing and substantially planar surfaces such that a second electrode is formed;
    disposing one separator sheet along the first planar surface of the first electrode, a second separator sheet along the second planar surface of the first electrode, a third separator sheet along the first planar surface of the second electrode, and a fourth separator sheet along the second planar surface of the second electrode such that the first electrode and the second electrode are separated by only two separator sheets to form a cell assembly; and
    winding the electrodes and sheets such that a cell assembly having a first end and a second end is formed and such that the first electrode, the second electrode, and the separator sheets are substantially co-parallel.

2. The method of claim 1 further comprising:
    attaching a first internal terminal with the first end of the cell assembly such that only the negative electrode is in electrical communication with the first internal terminal;
    attaching a second internal terminal with the second end of the cell assembly such that only the positive electrode is in electrical communication with the second internal terminal;
    inserting the cell assembly into a retaining vessel;
    filling the retaining vessel containing the cell assembly with an electrolyte; and
    sealing the retaining vessel such that the electrolyte and the cell assembly is substantially isolated from the environment.

3. The method of claim 1 further comprising:
    initially charging the rechargeable power cell according to a defined charging curve;
    individually testing the rechargeable power cell such that the rechargeable power cell is grouped by charge/discharge similarities.

4. The method of claim 1 wherein the negative electrode material is comprised of zinc oxide, bismuth oxide, aluminum oxide, hydroxyethyl cellulose, and the organic dispersant and wherein the positive electrode material is comprised of nickel hydroxide, zinc oxide, cobalt oxide, and carboxymethyl cellulose.

5. The method of claim 1 wherein the negative electrode material is comprised of calcium zincate, bismuth oxide, aluminum oxide, hydroxyethyl cellulose, and the organic dispersant and wherein the positive electrode material is comprised of nickel hydroxide, zinc oxide, cobalt oxide, and carboxymethyl cellulose.

6. The method of claim 1 wherein the first carrier sheet is comprised of copper or an alloy of copper.

7. The method of claim 6 wherein the first carrier sheet is comprised of perforated copper or an alloy of copper.

8. The method of claim 6 wherein the first carrier sheet is comprised of expanded copper or an alloy of copper.

9. The method of claim 1 wherein the second carrier sheet is comprised of nickel.

10. The method of claim 1 wherein the positive electrode material is a slurry or paste.

11. The method of claim 1 wherein the two separator sheets separating the first and second electrode comprise at least one microporous polyolefin layer.

12. The method of claim 1 wherein the negative electrode material comprises zinc oxide having at most about 1% by weight carbonate.

13. The method of claim 2 wherein the first terminal and the second terminal are attached to the cell assembly by any of the following techniques: spot welding, laser welding, sonic welding, or soldering.

14. The method of claim 13, wherein the first terminal is attached to the negative electrode by laser welding, wherein the laser is moved across the first terminal in a cross pattern or other tracking method that maximizes the number of weldments.

15. The method of claim 1, wherein the elevated temperature is at least about 300 C.

* * * * *